(12) United States Patent
Dinwiddie et al.

(10) Patent No.: US 6,433,831 B1
(45) Date of Patent: Aug. 13, 2002

(54) METHOD AND APPARATUS FOR AUTOMATICALLY SETTING TIME INFORMATION IN A MULTI-FORMAT DIGITAL TELEVISION PRODUCT

(75) Inventors: Aaron Hal Dinwiddie; Dan Richard Schneidewend, both of Hamilton; Steven Cooper, Jr., New Palestine, all of IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/475,446

(22) Filed: Dec. 30, 1999

Related U.S. Application Data
(60) Provisional application No. 60/144,424, filed on Jul. 16, 1999.

(51) Int. Cl.[7] .......................... H04N 7/00; H04N 11/00; H04N 5/44
(52) U.S. Cl. ...................... 348/553; 348/552; 348/461; 348/460; 725/25
(58) Field of Search .................. 348/460, 461, 348/553, 552; 386/83; 725/28–29, 25; 380/4–7

(56) References Cited

U.S. PATENT DOCUMENTS

| | | | |
|---|---|---|---|
| 3,833,779 A | * | 9/1974 | Leone ........................... 70/30 |
| 4,993,003 A | | 2/1991 | Fechner et al. ............... 368/47 |
| 5,329,500 A | | 7/1994 | Baik et al. .................... 368/10 |
| 5,331,353 A | * | 7/1994 | Levenson et al. ............ 348/725 |
| 5,557,585 A | | 9/1996 | Hanai et al. ................... 368/43 |
| 5,561,461 A | | 10/1996 | Landis et al. ................ 348/725 |
| 5,617,146 A | | 4/1997 | Duffield et al. .............. 348/460 |
| 6,169,580 B1 | * | 1/2001 | Shin et al. ................... 348/460 |

FOREIGN PATENT DOCUMENTS

EP 0562410 A1 9/1993 ............ G04G/5/00

* cited by examiner

*Primary Examiner*—Andrew Faile
*Assistant Examiner*—Paulos Natnael
(74) *Attorney, Agent, or Firm*—Joseph S. Tripoli; Robert D. Shedd

(57) ABSTRACT

A method and apparatus for allowing a user to manually set a clock in a multi-format television receiver capable of receiving a plurality of television signals. The method comprises the steps of selecting a television signal from one of a plurality of television signals and then detecting temporal information in the television signal. Upon detecting such temporal information, the temporal information is extracted and used to set at least one clock to count time. Once the clock is set based upon the temporal information, the temporal information prevails over any manually set time, and the user is precluded from manually setting the clock. The television receiver continues to update the clock based upon the latest periodic temporal information periodically sent with the television signal. The user is permitted to manually set the time on a clock only in an instance where the updated temporal information has not been detected past a specified period of time.

14 Claims, 3 Drawing Sheets

METHOD AND APPARATUS FOR AUTOMATICALLY SETTING TIME INFORMATION IN A MULTI-FORMAT DIGITAL TELEVISION PRODUCT

CROSS REFERENCE TO RELATED APPLICATIONS

This application claims the benefit of U.S. Provisional Application No. 60/144,424, filed Jul. 16, 1999, which is hereby incorporated by reference in its entirety.

BACKGROUND OF THE INVENTION

1. Field of Invention

The present invention relates to television receivers in general and, more particularly, the invention relates to a method and apparatus for setting the time of day information that is stored in a television receiver clock.

2. Background of the Disclosure

It is anticipated that future television receivers will be able to receive television signals from multiple sources, such as satellite, cable, and terrestrial broadcast. Moreover, such television receivers will be able to accommodate television signals including both analog and digital television formats.

Present analog television formats comprise those promulgated by the National Television Standards Committee (NTSC), Sequential Technique and Memory Storage (SECAM) and Phase Alternation by Line (PAL). Current digital formats comprise those promulgated by Direct Broadcast Satellite (DBS) such as DirectTV, and the digital terrestrial broadcasts such as High Definition Television (HDTV), in accordance with the American Television Standards Committee (ATSC) and the Movie Pictures Expert Group (MPEG) standards.

A problem has been identified in setting an integrated receiver and decoder (IRD) digital clock when multi-format sources are received by a television. Specifically, DBS receivers do not allow the user to set their own time, date, daylight savings time, or time zone information.

Furthermore, each format may, have temporal information transmitted along with the video and audio information. Broadcasts from digital terrestrial sources usually include temporal components, however, the temporal components may differ from channel to channel. For example, a channel for NBC may provide a digital temporal component having a time value of 2:06 p.m., while a channel for ABC may have a temporal component having a value of 2:09 p.m. Moreover, digital broadcasts from satellites may transmit temporal information that differs from the digital terrestrial broadcasts, e.g., 2:07 p.m. Conversely, typical broadcasts from analog terrestrial sources do not include temporal components.

Thus, the clock in the IRD of a television receiver is set by extracting the temporal components from the digitally transmitted television system. As a user changes the source for receiving the television signal, e.g., DBS to analog terrestrial broadcast, the user is prohibited from manually changing the clock time of the television. Therefore, the values of the temporal components in a television signal will subsequently be the time the clock of the television receiver maintains, until another digital broadcast source with temporal information is selected by the user.

A problem arises from the inability of a user to manually set time illustratively, when the user desires to record a specific program on a channel from one source (e.g., CBS broadcasted via an HDTV transmission, at 8:00 p.m.), but the television's internal clock was previously set by another source (e.g., DBS at 7:55 p.m.). In this instance, a clock in the user's television is set by the DBS temporal signal, and will display 7:55 p.m. The DBS temporal information is out of synchronization with the HDTV broadcasted temporal signal, lagging by five minutes. Five minutes later, when the clock displays 8:00 p.m., the recorder will begin to record the selected station, CBS. However, the first five minutes of the CBS programming will not be recorded, since the CBS channel time is five minutes faster than the HDTV broadcasted channel.

Additionally, there is a need to prohibit the user from manually setting the clock for a specified interval of time, so as to preclude an unwanted change in time. For example, a child may change the time of the television clock in order to record a program not suitable for child viewing. In this instance, the mere manipulation of the clock settings will allow the child to circumvent parental control.

Therefore, there is a need in the art for a method and apparatus that permit a user to selectively set the clock on their television receiver to adjust for time differences between the multi-formatted sources of television signals, without interfering with the temporal time transmitted by one of the multi-formatted television signals.

SUMMARY OF INVENTION

The disadvantages heretofore associated with the prior art are overcome by the present invention of a method and apparatus for allowing a user to manually set a clock in a multi-format television receiver capable of receiving a plurality of television signals. The method comprises the steps of selecting a television signal from one of a plurality of television signals and then detecting temporal information in the television signal. Upon detecting such temporal information, components of the temporal information are extracted and used to set at least one clock to count time. Once the clock is set based upon the extracted temporal components, the values of the temporal components prevail over any manually set time, and the user is precluded from manually setting a time value or date value on the clock. The television receiver continues to update the clock based upon the latest periodic temporal information sent with the television signal. The user is permitted to manually set the time on a clock only in an instance where the updated temporal information has not been detected past a specified period of time (e.g., 1-hour).

Additionally, a user may manually set the time zone value or daylight savings time value on the clock at any time. In order to count time based upon the temporal components detected in the television signal, the manual clock settings must match the values of the temporal components. A default device is provided to set the time zone value or daylight savings time value on the clock, in an instance that it is desirable to utilize such temporal information in the television signal.

Thus, a user may manually set the clock in a timely manner without interfering with broadcasted television signal having temporal information. In addition, the user may prohibit other users from manually setting the clock for a specified interval of time, so as to preclude an unwanted change in time (e.g. a child attempting to watch or record a program not suitable for child viewing).

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

The invention will be primarily described within the context of a television receiver adapted to receive television signals including temporal information. The temporal information may comprise temporal components such as, time, date, time zone, and daylight savings time. However, it will be appreciated by those skilled in the art that the invention is well suited to any system in which time of day information may be updated in response to received time of day information, or in response to locally provided (e.g., manually entered) time of day information.

Figure 1:
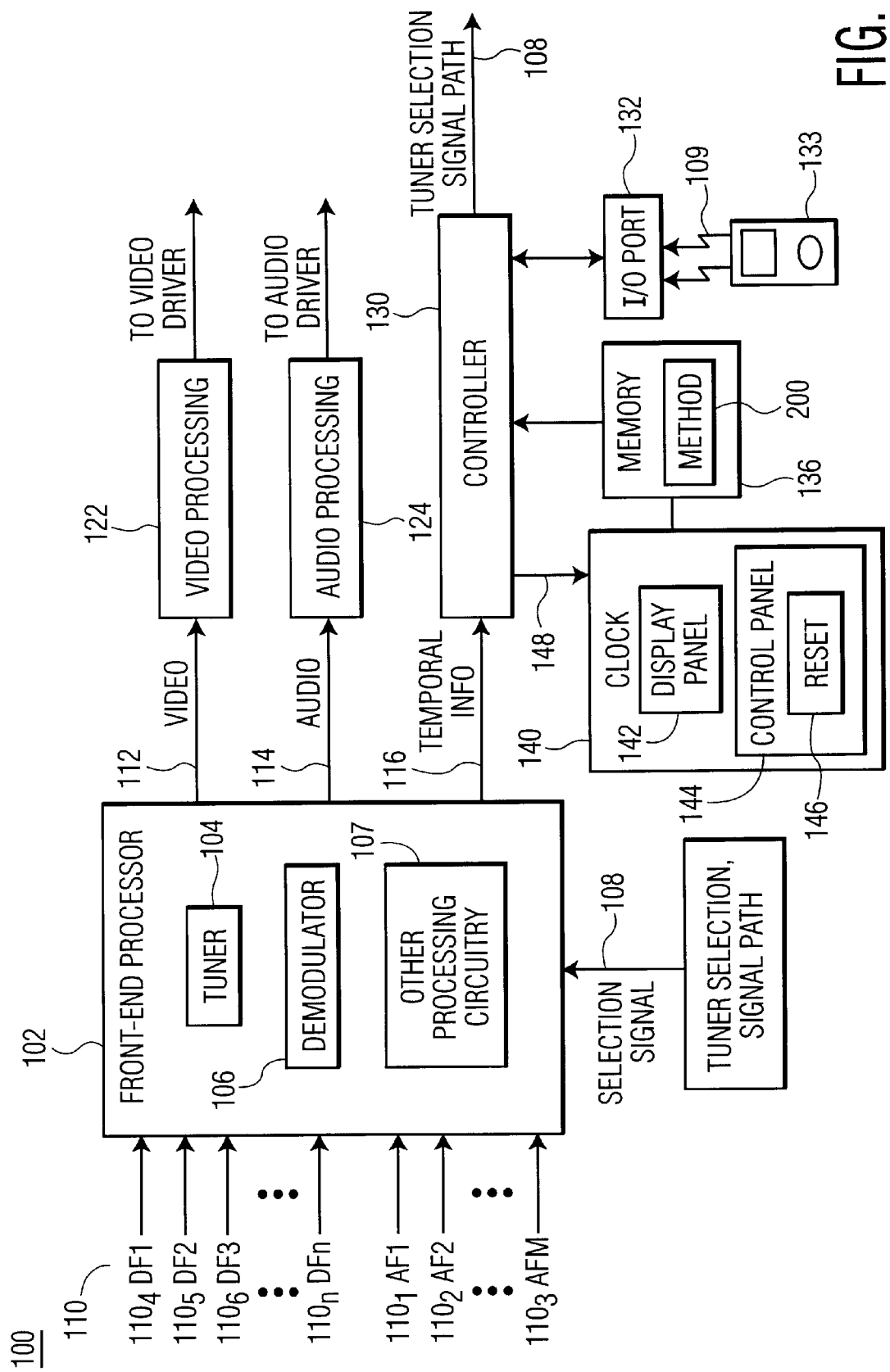
FIG. 1 depicts a block diagram of a multiple format television receiver.

FIG. 1 depicts a block diagram of a multiple format television receiver 100. The television receiver 100 tunes, demodulates, and processes audio, video, and temporal information from various multiple format television signals selected by a user. The multiple format television signals include direct broadcast satellite signals (DBS) such as DirectTV, digital terrestrial broadcasts, such as high definition television (HDTV), and analog terrestrial broadcasts, in accordance to the National Television Standards Committee (NTSC).

The audio components, video components, and temporal components (if present) are then sent to their respective output devices such as a speaker, display, and clock, respectively. The television receiver 100, in the preferred embodiment, may comprise a television set-top box, a video cassette recorder (VCR), a computer, or any other device capable of receiving television signals having temporal information.

The television receiver 100 comprises a front-end processor 102 having at least one tuner 104, at least one demodulator 106 and other processing circuitry 107. The receiver 100 selectively tunes, demodulates or otherwise "receives" at least one of a plurality of television signals $110_1$ through $110_n$ (collectively television signals 110) in response to a selection signal via a tuner selection signal path 108. The television signals 110 are transmitted in either analog or digital formats (e.g., AF-1 through AF-m, or DF-1 through DF-n). The circuitry used to implement the front-end processor 102 is adapted to receive television signals 110 of the desired format types. The analog formats include those used by conventional analog broadcasting or cable transmission systems, illustratively the NTSC, SECAM, or PAL transmission standards. The digital formats include satellite broadcast formats such as Digital Broadcast Satellite (DBS), as well as terrestrial broadcast and cable transmission systems, such as high definition television (HDTV) and cable formats, each conforming to the ATSC and MPEG transmission standards. Thus, the front-end processor 102 is capable of processing television signals according to each of a plurality of standard television formats.

A controller assembly 130 is coupled to the front-end processor 102 through the tuner selection path 108 to permit a user to select and tune the front-end processor 102 to any one of the multi-format television signals 110. The user makes a selection through an input device 133 such as a remote control, and sends a channel select signal 109 from the input device 133 to an I/O port 132 coupled to the controller assembly 130. The controller 130 then sends the selection signal to the tuner 104 of the front-end processor 102 through the tuner selection signal path 108.

The front-end processor 102, in response to the selection signal provided by the controller 130, operates to tune a selected television signal 110, demodulate video and audio information within the selected television signal, and provide the video and audio information to, respectively, a video processor 122 (via signal path 112) and an audio processor 124 (via signal path 114). The video processor 122 and audio processor 124 process the video and audio information and then send the video and audio information to their respective output devices, such as a monitor and speaker. Additionally, any temporal information included with the tuned television signal 110 is provided to the controller 130 via signal path 116.

When temporal information is provided from a television signal source, the temporal components, i.e., time, date, time zone, and daylight savings time are extracted from the television signal. Thereafter, the values of the extracted temporal components are stored in a memory device 136. Typically, temporal information is periodically transmitted by the television broadcaster along with the program information, e.g., every 15 or 30 minutes. The temporal information may be transmitted through an electronic program guide (EPG), such as program specific information protocols (PSIP) for digital transmissions complying with the ATSC standard.

At least one clock 140 is provided in the television receiver 100 (one clock shown in FIG. 1). The clock comprises a display 142, a control panel 144, and support circuitry (not shown). The clock 140 is also coupled to the memory device 136 of the controller 130. A clock signal path 148 allows the controller to periodically update the clock 140 with the temporal information extracted from the television signal 110, (e.g., EPG). At each periodic update, the updated time information is stored in the memory 136. Thereafter, the clock continues to count internally until the next transmission of temporal information is sent via the EPG.

In a preferred embodiment, there is a corresponding clock for each television format that contains temporal information. For example, there is a clock for each terrestrial digital broadcast source or digital broadcast satellite source. Other embodiments may include television receivers having a plurality of clocks wherein each clock corresponds to each channel or most popular channels of a television source having temporal information.

The clock 140 serves multiple functions, such as displaying temporal information including the time of day, date, daylight savings time, and time zone. The display may illustratively be an LED display panel or a graphic user interface (GUI), accessible through a control panel 144 or the remote control device 133. Additional clock capabilities may include allowing a user to preset the time or date on the clock 140 when the user, illustratively, desires to record a television program on a specific channel, or prohibit channel selection based upon the time of day. Such channel prohibition may be desirable for the purpose of disallowing children from watching discretional or inappropriate video programs.

The control panel 144 is used for manually setting the clock's temporal information. Furthermore, the control panel 144 may be accessible through an on-screen GUI or the remote control device 133.

Additionally, a default device 146 is coupled to the clock 140. The default device may illustratively be a button on a control panel or remote control device, or a GUI accessible on the display screen of the television set. The default device 146 allows a user to reset the clock to count time based upon the time zone and daylight savings time components residing in the temporal information included in the television signal 110. After the user has set the time-on the time zone or daylight savings values 140 manually, or changes from a television signal format not containing temporal information to a television signal format having temporal information, the user will not know the exact time components that were sent via the EPG. Therefore, such default device resets the clock 146 based upon whatever temporal information is sent via the television signal 110.

Figure 2:
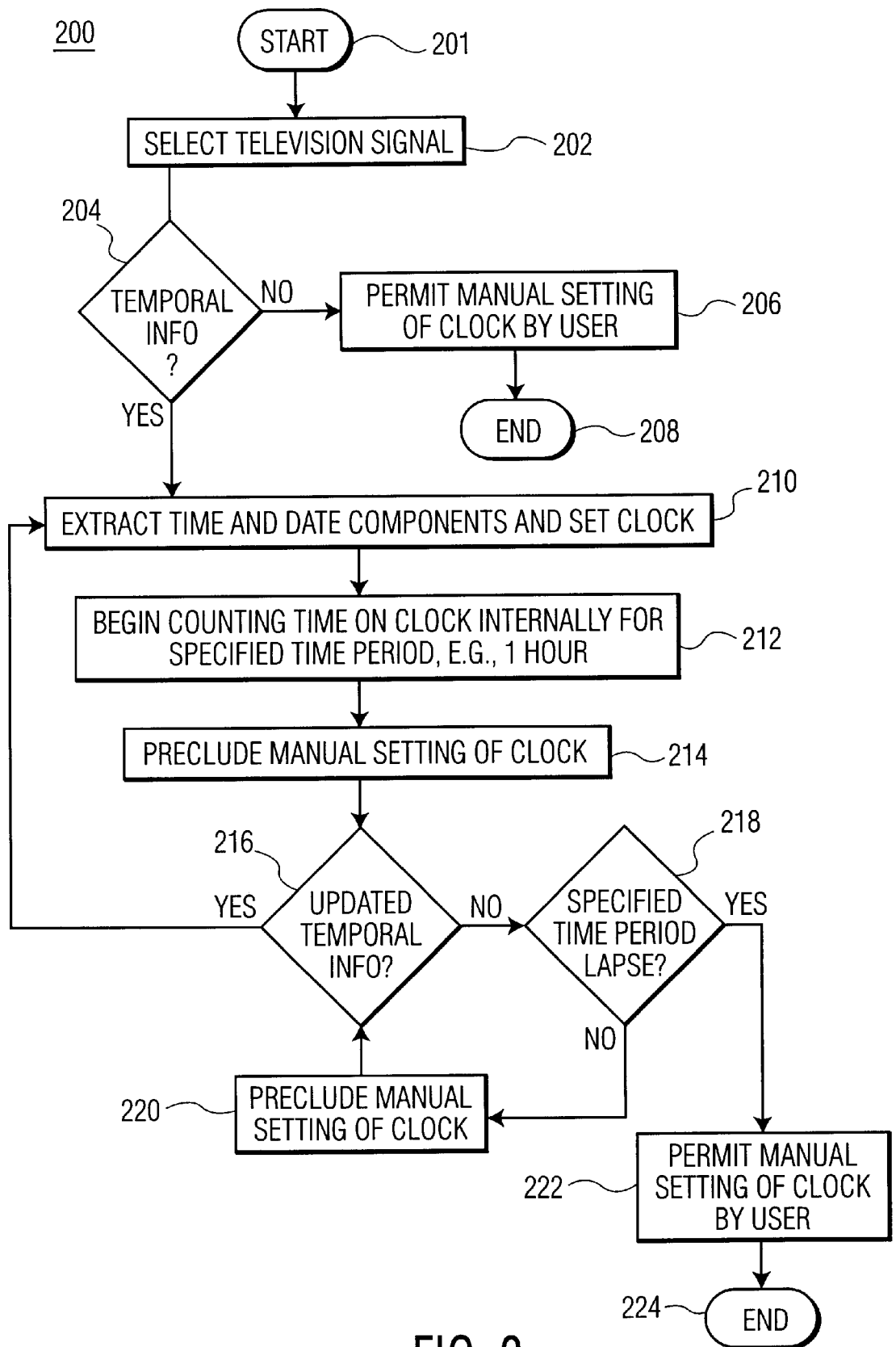
FIG. 2 depicts a flow diagram of a first method for setting a clock on a television receiver.

FIG. 2 depicts a flow diagram of a first method 200 for setting time on a clock of a television receiver. The first method 200 pertains to temporal information including time and date components such as hours, minutes, and seconds, as well as, year, month, and day, respectively. Such first method 200 is implemented by the cooperation between the controller 130 and circuitry of the clock 140. Furthermore, the first method 200 permits a user to modify the time on a clock manually and without interfering with a television signal providing the temporal information. Additionally, this first method 200 may be used to preclude a user from manually changing the clock settings for a specified period, illustratively, to prevent a child from resetting the clock in order to watch an inappropriate television program.

The first method 200 begins at step 201, and proceeds to step 202 where a user selects, via an input device (e.g., remote control), the television signal of their choice. The selected television signal is received by a front-end processor, demodulated, down-converted and then sent to video and audio processors for processing. The video and audio processors produce video and audio signals containing information that is then sent to the television set's respective output devices, such as a monitor and speaker.

In step 204, the first method 200 queries whether there is temporal information in the selected television signal. If in step 204, the query is negatively answered (i.e., the user selected a conventional analog broadcast station or a digital terrestrial broadcast without a program specific information protocol (PSIP) guide), then the clock will not be set by the selected television signal. However, in step 206, a user may manually set the clock, and the clock will thereafter count time internally based upon the user defined settings. At step 208, the method ends, and will not start again until the user selects another program. Thus, one aspect of the first method 200 is that the user may manually set the clock to any time, as long as temporal information from a television signal has not been received and stored by the clock.

If, in step 204, the query is affirmatively answered, i.e., there is temporal information (i.e., time and date components) detected in the television signal (e.g., from a DBS system), then the method proceeds to step 210. In step 210, each of the time components (i.e., hours, minutes, and seconds) and date components (i.e., year, month, and day) are extracted from the television signal, stored in the memory, and then displayed on the clock display.

After the clock receives the transmitted temporal information, in step 212, the clock continues to count internally based upon the received time and date components. Upon receiving temporal information from the television signal, at step 214, the user is precluded from manually changing the time and date settings (i.e., hours, minutes, seconds, year, month and day) for some specified period, e.g., 1-hour, regardless of whether the user changes television programs.

During a typical digital broadcast format, such as DBS, the digital broadcaster will periodically transmit updated temporal information during the course of program broadcasting, i.e., every 15, or 30 minutes. In step 216, the first method 200 queries whether there is updated temporal information in the television signal. If, in step 216, the query is affirmatively answered, then the first method 200 returns to step 210, where the time and date components are again extracted and stored in the memory device of the controller. In step 212, the clock counts internally based upon the updated time component, and in step 214, the user remains precluded from manually setting the clock.

This subroutine loop within first method 200 proceeds in this manner until in step 216, the query is negatively answered, and then the first method 200 proceeds to step 218. In step 218, the first method 200 queries whether a specified time period (e.g., 1-hour) has lapsed. The specified time period is utilized as a timing mechanism for the purpose of providing a reasonable assumption that the user has terminated the television source. The assumption is confirmed if the clock has not been updated with temporal information within the specified time period (e.g., 1-hour).

For example, the user selects a television channel having date and time components that sets the clock to Nov. 24, 1999, at 3:04 p.m. The clock will continue to count internally thereafter, and the television receiver queries for periodic updates of temporal information from the electronic program guide due every 15 or 30 minutes, as depicted in the loop defined by steps 210 through 216. If, however, there is no update within the next hour, then at 4:04 p.m. the query at step 218 (referring back to FIG. 2) is affirmatively answered (i.e., the specified time period has lapsed) and the first method 200 proceeds to step 222. In step 222, the user may henceforth manually set the clock. The first method 200 proceeds to step 224, where the method ends, until another television signal is selected having temporal information, and the method begins again.

Thus, the first method 200 allows the manual changing of a clock setting in a television receiver prior to receiving any temporal information in a television signal and after receiving a television signal having temporal information, but only after a specified period of time has elapsed. In this manner, a person (e.g., child) may be precluded from tampering with the time of the television receiver in order to watch programs deemed undesirable for viewing, illustratively, by a guardian.

Figure 3:
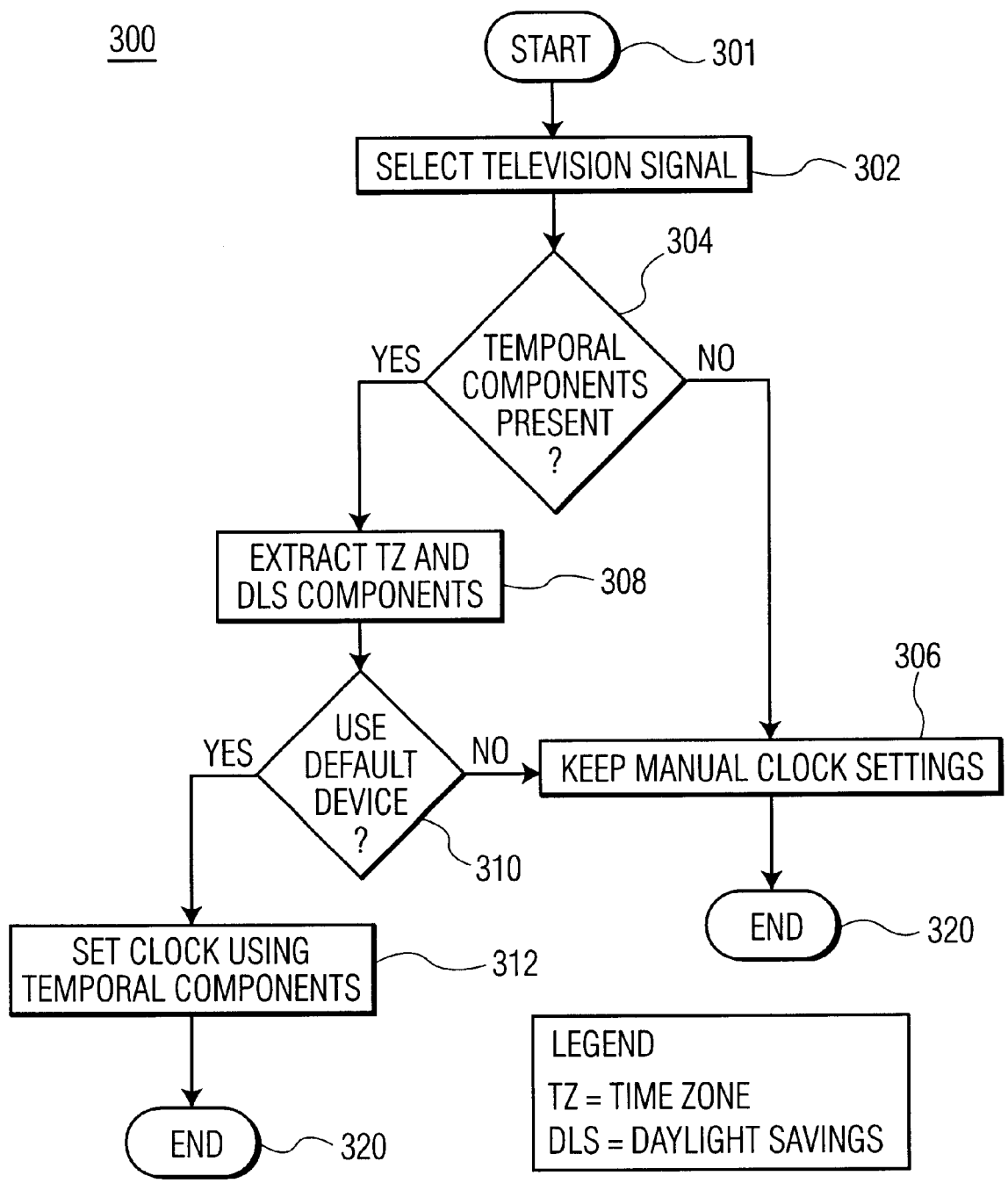
FIG. 3 depicts a flow diagram of a second method for setting a television receiver clock.

FIG. 3 depicts a flow diagram of a second method 300 for setting a television receiver clock. The second method 300 pertains to temporal information having time zone, and daylight savings components. These two temporal elements may be manually changed by a user at any time, unlike the time and date components (i.e., hours, minutes, seconds, year, month and day) that may not be manually changed, except as provided for in the first method 200 depicted in FIG. 2.

Any manual changes by the user to the time zone or daylight savings time do not affect the values of the time or date (i.e., hours, minutes, seconds, year, month, and day) components received from the television signals. Such auxiliary temporal information (i.e., time zone and daylight savings time) is based upon the time and date components, and displayed on the clock by either adding or subtracting time values as an offset to the time and date components.

The electronic program guides are typically based on Greenwich Mean Time. Thus, while the user is prohibited from changing the physical time and date components (hours, minutes, seconds, year, month, and day), the time zone and daylight savings time values may be changed, since these values are either a positive or negative offset from the current time and date.

For example, a user may manually change the time zone value of their clock to 4:07 p.m. Eastern Standard Time (EST) in New York, where the television receiver is receiving a television signal program containing date and time values of Dec., 25, 1999, at 9:07 p.m. GMT. The second method 300 similarly applies for the daylight savings time components.

The second method 300 begins at step 301 and proceeds to step 302, where a user selects a television signal carrying a desired program. The television signal is received by the front-end processor, demodulated, down-converted, and processed to extract the video, audio, and temporal (if any) components. The extracted video, audio and temporal components are then sent to their respective television set outputs, such as a monitor, speaker and clock.

In step 304, the second method 300 queries whether there is temporal information in the television signal. If the query of step 304 is negatively answered, then the clock may not be updated by the incoming television signal (e.g., an analog terrestrial broadcast). However, in step 306, the clock may then be manually set by a user, and in step 320, the method ends. Manual clock settings are hereinafter defined as clock values selectively changed by a user, or the present clock values that are not based upon temporal components from a television signal. Thus, in the instance where the television receiver does not receive temporal information, the user may manually set the clock for the time of day, date, time zone and daylight savings time.

If, at step 304, the query is affirmatively answered, i.e., temporal information is received by the television receiver, then the second method 300 proceeds to step 308. In step 308, the front-end processor extracts any temporal components, including time zone and/or daylight saving components that may be present. However, in this instance, the television receiver does not permit the user to utilize the temporal values of the time zone and daylight savings components sent in the television signal, unless the user manually changes the time zone and daylight savings time settings to exactly match the temporal values in the television signal. Since the temporal components are embedded with the broadcasted television signal, the user will not know the temporal values for the time zone and/or daylight savings components.

For example, a broadcaster transmits the video and temporal information including time zone and daylight savings components based upon the zip code of the user. Furthermore, the user resides in a city on the cusp of the Eastern and Central Time Zones of the United States. In this instance, the zip code places the user in the Eastern Time Zone, however the user's location is actually in the Central Time Zone. Thus, the user is sent incorrect temporal information based on Eastern Standard Time (EST).

If the user wishes to correct their time zone and/or daylight savings clock settings from EST to Central Standard Time then, the user may manually change the clock setting. Any new temporal components transmitted by the broadcaster is stored internally, however the values of such temporal components are not displayed on the clock. Thus, if the user later decides to set the clock based upon the broadcasted temporal information, the subscriber will not know the values of the temporal components.

As such, the second method 300, at step 310, provides a default device to set the clock based upon the temporal information in the television signal. In step 310, if the user affirmatively decides to utilize the default device, then the second method 300 proceeds to step 312, where the temporal components from the television signal are used for setting and sequentially updating the clock, thereby overriding the previous manual settings for the time zone and/or daylight savings time. Once the television receiver has defaulted to count based upon the temporal information in the television signal, the clock will continue to count time internally and receive periodic updates of the temporal information.

Alternately, in step 310, if the query is negative, i.e., the user decides that the clock settings for time zone and/or daylight savings are not going to be based upon the values of the temporal components in the television signal, then the second method 300 proceeds to step 306. In step 306, the previous time zone and/or daylight savings values, which were not updated by temporal components from a television signal are maintained, and at step 320, the method 300 ends.

Thus the second method 300 permits a user to manually set the clock on a television receiver at any given time for the time zone and/or daylight savings time. In addition the default device provides a user with a feature to set the clock based upon the values of the temporal components transmitted in a television signal, instead of the previous manual settings. In this manner, a user may adjust the clock settings to satisfy their requirements.

It should be apparent to those skilled in the art that a novel system for setting a clock in a multi-format receiver has been provided. The method described herein overcomes the disadvantages associated with the prior art. Although various embodiments that incorporate the teachings of the present invention have been shown and described in detail herein, those skilled in the art can readily devise many other varied embodiments that still incorporate these teachings.

What is claimed is:

1. A method for allowing a user to manually set a clock in a multi-format television receiver capable of receiving a plurality of television signals comprising the steps of:

selecting a television signal from one of said plurality of television signals;

detecting temporal information in said selected television signal;

extracting from said temporal information, a time component or a date component;

setting at least one clock from said extracted temporal information and counting time, wherein said extracted time or date components prevail over any manually set time;

precluding said user from manually setting a time value or a date value on said clock;

setting said at least one clock and counting time based upon periodic temporal information updates from said television signal; and allowing said user to manually set said clock in an instance where said updated temporal information has not been detected past a specified period of time.

2. The method of claim 1, further comprising the step of:

manually setting said clock prior to receiving said temporal information in said television signal.

3. The method of claim 1, comprising the step of:

precluding said user from manually setting said clock in an instance where said updated temporal information has been detected within said specified period of time.

4. The method of claim 1, comprising the step of:

setting a time zone value or a daylight savings time value manually on said clock.

5. The method of claim 4, comprising the steps of:

extracting from said temporal information, a time zone component or a daylight savings time component; and determining whether to set said clock based upon said temporal information via a default device.

6. The method of claim 5, comprising the steps of:

selecting said default device to set said time zone value or said daylight savings time value on said clock to match said time zone component or said daylight savings time component of said extracted temporal information, in an instance that it is desirable to set said clock based upon said temporal information; and updating said clock based upon updated temporal information received in said television signal.

7. The method of claim 5, comprising the step of:

retaining said time zone value or said daylight savings value manually set by said user in an instance that it is not desirable to set said clock based upon said temporal information.

8. Apparatus for allowing a user to manually set a clock in a multi-format television receiver capable of receiving a plurality of television signals comprising:

means for selecting a television signal from one of said plurality of television signals;

means for detecting temporal information in said selected television signal;

means for extracting from said temporal information, a time component or a date component;

means for setting at least one clock from said extracted temporal information and counting time, wherein said extracted time or date components prevail over any manually set time;

means for precluding said user from manually setting a time value or a date value on said clock;

means for setting said at least one clock and counting time based upon periodic temporal information updates from said television signal; and allowing said user to manually set said clock in an instance where said updated temporal information has not been detected past a specified period of time.

9. The apparatus of claim 8, further comprising:

means for manually setting said clock prior to receiving said temporal information in said television signal.

10. The apparatus of claim 8, comprising:

means for precluding said user from manually setting said clock in an instance where said updated temporal information has been detected within said specified period of time.

11. The apparatus of claim 8, comprising:

means for setting a time zone value or a daylight savings time value manually on said clock.

12. The apparatus of claim 11, comprising:

means for extracting from said temporal information, a time zone component or a daylight savings time component; and means for determining whether to set said clock based upon said temporal information via a default device.

13. The apparatus of claim 12, comprising:

means for selecting said default device to set said time zone value or said daylight savings time value on said clock to match said time zone component or said daylight savings time component of said extracted temporal information, in an instance that it is desirable to set said clock based upon said temporal information; and means for updating said clock based upon updated temporal information received in said television signal.

14. The apparatus of claim 12, comprising:

means for retaining said time zone value or said daylight savings value manually set by said user in an instance that it is not desirable to set said clock based upon said temporal information.

* * * * *